US012389277B2

(12) United States Patent
Kapadia et al.

(10) Patent No.: US 12,389,277 B2
(45) Date of Patent: Aug. 12, 2025

(54) OFFLOADING A USER DEVICE INTO A WIRELESS NETWORK USING AN ANDSF APPLICATION

(71) Applicant: ESW Technologies FZ-LLC, Austin, TX (US)

(72) Inventors: Jignesh Kapadia, Gurgaon (IN); Shalin Shah, Gurgaon (IN)

(73) Assignee: ESW Technologies FZ-LLC, Austin, TX (US)

( * ) Notice: Subject to any disclaimer, the term of this patent is extended or adjusted under 35 U.S.C. 154(b) by 379 days.

(21) Appl. No.: 17/133,671

(22) Filed: Dec. 24, 2020

(65) Prior Publication Data

US 2022/0022098 A1    Jan. 20, 2022

(51) Int. Cl.
*H04W 28/00* (2009.01)
*H04W 28/08* (2023.01)
*H04W 36/14* (2009.01)

(52) U.S. Cl.
CPC ... *H04W 28/0942* (2020.05); *H04W 28/0838* (2020.05); *H04W 28/0992* (2020.05); *H04W 36/1446* (2023.05)

(58) Field of Classification Search
CPC ..... H04W 36/14; H04W 48/18; H04W 24/02; H04W 24/08; H04W 28/0236; H04W 28/08; H04W 48/04; H04W 88/18; H04W 12/068; H04W 28/0838; H04W 28/0942; H04W 28/0992; H04W 36/22; H04W 48/14; H04W 8/18; H04L 61/4511; H04L 61/4541; H04L 61/50; H04L 63/0428; H04L 63/08; H04L 67/02; H04L 67/10; H04L 67/1097; H04L 67/12; H04L 9/40
See application file for complete search history.

(56) References Cited

U.S. PATENT DOCUMENTS

| | | | |
|---|---|---|---|
| 11,917,687 B2 * | 2/2024 | Sahlin | H04B 7/0695 |
| 2014/0106743 A1 * | 4/2014 | Ferraro Esparza | H04W 48/18 |
| | | | 455/426.1 |
| 2015/0111569 A1 * | 4/2015 | Gupta | H04L 1/1678 |
| | | | 455/552.1 |

(Continued)

FOREIGN PATENT DOCUMENTS

| | | | | |
|---|---|---|---|---|
| WO | WO-2012142437 A1 * | 10/2012 | | H04L 45/123 |
| WO | WO-2014182341 A1 * | 11/2014 | | H04W 36/008375 |

(Continued)

*Primary Examiner* — Gerald A Smarth (57) ABSTRACT

The present disclosure provides a method for automatic offloading of a user device into wireless network (Wi-Fi) using an ANDSF application. The method includes a first step to configure available wireless network (Wi-Fi) at the user device. The method includes a second step to validate wireless network (Wi-Fi) at the user device. The method includes a third step to offload the user device into wireless network (Wi-Fi). In addition, wireless network (Wi-Fi) is configured into ANDSF policy. Further, ANDSF policy is configured in ANDSF server. Furthermore, ANDSF server is associated with the ANDSF application. Moreover, wireless network (Wi-Fi) is validated using the ANDSF application. Also, the ANDSF application validates configured wireless network (Wi-Fi) based on Quality of Experience (QOE) parameters. Also, the user device is offloaded using the ANDSF application.

22 Claims, 3 Drawing Sheets

(56) References Cited

U.S. PATENT DOCUMENTS

2015/0195760 A1\* 7/2015 Sanz ................... H04W 36/22
                                                    370/230
2019/0208450 A1\* 7/2019 Zait ........................ H04W 8/18
2019/0306866 A1\* 10/2019 Agrawal ................ H04W 8/22

FOREIGN PATENT DOCUMENTS

WO    WO-2015026791 A1 *  2/2015    ........ H04W 28/0268
WO    WO-2015147790 A1 *  10/2015   ............. H04L 43/16

\* cited by examiner

OFFLOADING A USER DEVICE INTO A WIRELESS NETWORK USING AN ANDSF APPLICATION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates to the internet technology and in particular, relates to a method to automatic offload user device into wireless network using an ANDSF application. The present application is a complete specification based on, and claims priority from an Indian Application Number 202011002177 filed on 17 Jul. 2020, the disclosure of which is hereby incorporated by reference herein.

Description of the Related Art

Over the last few years, internet has been one of the most transformative and fast-growing technologies. With increase in demand for internet, mobile data traffic has increased. In addition, rapid proliferation of mobile data traffic and limited mobile network spectrum, there comes a need for Wi-Fi technology. The term Wi-Fi stands for "wireless fidelity" and is commonly used to refer wireless networking technology. In general, Wi-Fi is a universal wireless networking technology that utilizes radio frequencies to transfer data. In addition, Wi-Fi provides high-speed Internet connection to media devices without the use of cables. Further, the media devices scans for available Wi-Fi networks and gets connected with any one of the available Wi-Fi networks randomly. For example, there are four Wi-Fi networks available. In addition, all four Wi-Fi networks have different speeds. The media device may connect with the Wi-Fi network having least speed even when the Wi-Fi networks with higher speeds are available. This leads to inefficient usage of data speeds.

In light of the above stated discussion, there is a need for a method and system that connects the media device to the relevant Wi-Fi network.

BRIEF SUMMARY OF THE INVENTION

In an aspect, the present disclosure provides a method for automatic offloading of a user device into a wireless network (Wi-Fi) using an Access Network Discovery and Selection Function (ANDSF) application. The method includes a first step to configure available wireless network (Wi-Fi) at the user device. In addition, the method includes a second step to validate a wireless network (Wi-Fi) at the user device. Further, the method includes a third step to offload the user device into the wireless network (Wi-Fi). Furthermore, the wireless network (Wi-Fi) is configured into an ANDSF policy. Moreover, the ANDSF policy is configured in an ANDSF server. Also, the ANDSF server is associated with the ANDSF application. Also, the wireless network (Wi-Fi) is validated using the ANDSF application. Also, the ANDSF application validates the configured wireless network (Wi-Fi) based on Quality of Experience (QOE) parameters. Also, the user device is offloaded using the ANDSF application. Also, the ANDSF application offloads the user device into the wireless network (Wi-Fi) with high signal strength.

A primary object of the present disclosure is to provide a method to offload a user device from mobile network to Wireless network using an ANDSF application.

Another object of the present disclosure is to provide the ANDSF application that utilizes intelligent network services to monitor device events, QoE (Quality of Experience) parameters and rules and actions on policy.

Yet another object of the present disclosure is to provide the ANDSF application that utilizes 3GPP standard policy management to manage policy pull cache, evaluation, and application.

Yet another object of the present disclosure is to provide the ANDSF application that utilizes EDGE analytics to check user activity such as location, radio, and proximity analytics and on/off network usage.

In an embodiment of the present disclosure, the ANDSF application further includes a method to capture analytics information at the user device. In addition, analytics information includes policy pull, evaluation, offload, RAM usage, and up time. Further, analytical information is captured for each data session associated with wireless network (Wi-Fi) and mobile network. Furthermore, analytical information is stored into local database associated with the user device.

In an embodiment of the present disclosure, the ANDSF application monitors QoE (Quality of Experience) parameters during offloading of the user device. In addition, QoE parameters are monitored for checking signal strength associated with wireless network (Wi-Fi).

In an embodiment of the present disclosure, the ANDSF application allocates one or more dynamic servers during increase in number of users at particular location. In addition, the ANDSF application allocates the one or more dynamic servers based on MCC (Mobile Country Code) and MNC (Mobile Network Code) value captured from wireless network (Wi-Fi).

In an embodiment of the present disclosure, the ANDSF application applies batch logic during increase in number of users. In addition, batch logic is applied using policy pull associated with the ANDSF application.

In an embodiment of the present disclosure, the ANDSF application supports validation of location based policy using 3GPP location identifiers.

In an embodiment of the present disclosure, the ANDSF application facilitates regulate RSS check during reduction in signal strength of wireless network (Wi-Fi). In addition, regulate RSS check avoids toggling in wireless network (Wi-Fi).

In an embodiment of the present disclosure, the ANDSF application includes policy and customized logic for reconnecting the user device. In addition, policy and customized logic for reconnecting the user device facilitates the ANDSF application in saving bandwidth usage.

In an embodiment of the present disclosure, the ANDSF application implements PLMN based restriction. In addition, PLMN based restriction facilitates the ANDSF application for allowing registration of the user device using configured MCC (Mobile Country Code) and MNC (Mobile Network Code).

In an embodiment of the present disclosure, the ANDSF application supports offloading of the user device on pre-configured WPA-Wi-Fi.

In an embodiment of the present disclosure, the ANDSF application includes ANDSF server. In addition, ANDSF server controls the ANDSF application using push notification

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:
- 100. ANDSF mobility architecture.
- 102. Core network.
- 104. MME.
- 106. PGW.
- 108. AAA.
- 110. PCRF.
- 112. eNodeB.
- 114. HSS.
- 116. OCS.
- 118. NMS.
- 120. Internet breakout.
- 122. Access network.
- 124. AP.
- 126. WLC.
- 128. Wi-Fi Gateway.
- 130. ANDSF application.
- 132. ANDSF server.
- 134. SPR.
- 136. EMS server.
- 138. EDGE analytics server.
- 140. Cloud.
- 142. SDK.
- 144. EAP authentication.
- 146. User device.
- 200. Flow chart.
- 202. The start step.
- 204. The step of configuring available wireless network (Wi-Fi).
- 206. The step of validating wireless network (Wi-Fi).
- 208. The step of offloading a user device into wireless network (WiFi).
- 210. The stop step.
- 300. Block diagram.
- 302. Bus.
- 304. Memory.
- 306. Processors.
- 308. Presentation components.
- 310. Input/output (I/O) ports.
- 312. Input/output components.
- 314. Illustrative power supply.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Figure 1:
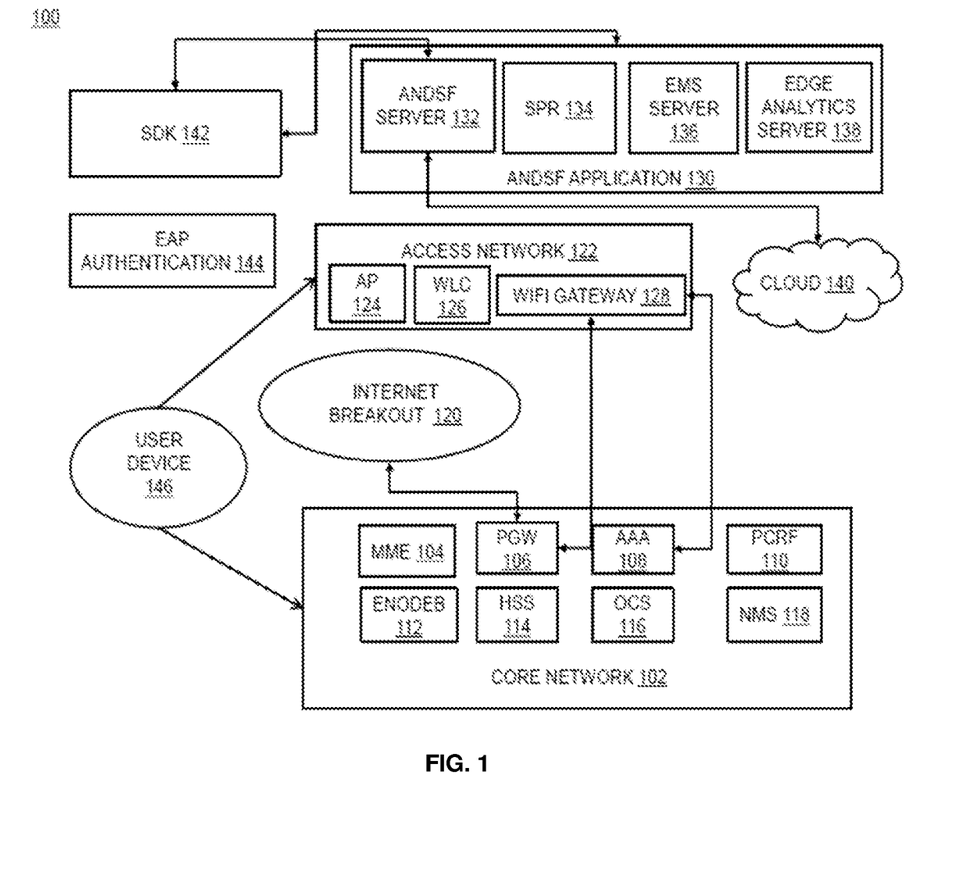
FIG. 1 illustrates an ANDSF mobility architecture utilized for offloading a user device from mobile network to wireless network (Wi-Fi) using an ANDSF application, in accordance with various embodiments of the present disclosure.

FIG. 1 illustrates an ANDSF mobility architecture 100 utilized to offload a user device 146 from mobile network to wireless network (Wi-Fi) using an ANDSF application 130, in accordance with various embodiments of the present disclosure. The ANDSF mobility architecture 100 includes a core network 102, access network 122, the ANDSF application 130, the user device 146, internet breakout 120, EAP authentication 144, SDK 142 and cloud 140. In addition, the ANDSF mobility architecture 100 includes MME 104, PGW 106, AAA 108, PCRF 110, eNodeB 112, HSS 114, OCS 116, and NMS 118. Further, the ANDSF mobility architecture 100 includes AP 124, WLC 126, Wi-Fi Gateway 128, ANDSF server 132, SPR 134, EMS server 136, and EDGE analytics server 138.

The ANDSF mobility architecture 100 includes the core network 102. In addition, the core network 102 corresponds to communication service provider (CSP) core network. In general, communication service provider (CSP) facilitates telecommunication services. In addition, communication service provider (CSP) includes telecommunication carrier, content, and application service provider (CASP), cable service provider, satellite broadcasting operator, and cloud communications service provider. In an embodiment of the present disclosure, the core network 102 includes but may not be limited to MME 104, PGW 106, AAA 108, PCRF 110, eNodeB 112, HSS 114, OCS 116, and NMS 118. In an example, MME (Mobility Management Entity) 104 facilitates in paging and authentication of mobile device. In addition, MME 104 retains location information at tracking area level for each user and selects appropriate gateway during registration process. Further, MME 104 connects to eNodeB (evolved node b) 112 through the S1-MME interface. Furthermore, MME 104 facilitates signaling between LTE and 2G/3G networks. In an example, PGW (Packet Data Network Gateway) 106 facilitates allocation of IP addresses to mobile device. In addition, PGW 106 filters user traffic for quality of service differentiation between a plurality packet flows. In an example, AAA 108 corresponds to Authentication, authorization and accounting. In addition, AAA 108 is utilized to track user activities on an IP-based network and controls access to network resources. In an example, PCRF 110 corresponds to policy and charging rules function. In addition, PCRF (Policy and Charging Rules Function) 110 supports service data flow detection, policy enforcement and flow-based charging. In an example, eNodeB 112 corresponds to evolved node B. In addition, eNodeB 112 is hardware that communicate with mobile device wirelessly. In an example, HSS 114 corresponds to Home Subscriber Server. In addition, HSS 114 facilitates communication service provider (CSP) to manage customers in real-time. In an example, OCS 116 corresponds to online charging system. In addition, OCS 116 facilitates communication service provider (CSP) to charge customers based on service-usage in real-time. In an example, NMS 118 corresponds to network management system. In addition, NMS 118 performs one or more functions. Further, the one or more functions include monitoring, maintaining and optimizing a network. Furthermore, NMS manages hardware and software elements associated with the network.

In an embodiment of the present disclosure, PGW (Packet Data Network Gateway) 106 is associated with internet breakout 120. In an example, internet breakout 120 removes traffic from the core network 102. In addition, internet breakout 120 improves access to cloud applications. In an embodiment of the present disclosure, the core network 102 is connected with access network 122 and the user device 146.

The ANDSF mobility architecture 100 includes access network 122. In an embodiment of the present disclosure, access network 122 includes but may not be limited to AP (Access Point) 124, WLC (Wireless LAN Controller) 126, and Wi-Fi Gateway 128. In general, AP (Access Point) is hardware device that connects plurality of wireless devices. In general, WLC (Wireless LAN Controller) 126 is utilized to manage light weight access point. In general, Wireless Gateway routes packets from one wireless LAN to other wireless LAN. In an embodiment of the present disclosure, Wireless Gateway 128 is associated with PGW. (Packet Data Network Gateway) 106. In an embodiment of the present disclosure, Wireless Gateway 128 is associated with AAA (Authentication, authorization and accounting) 108.

The ANDSF mobility architecture 100 includes the ANDSF application 130. The ANDSF application 130 includes ANDSF server 132, SPR 134, EMS server 136, and EDGE analytics server 138. In general, SPR corresponds to Subscription Profile Repository. In addition, SPR is database that is utilized to store subscriber related information. Further, subscriber related information contains policy and charging control. In general, EMS server corresponds to enterprise messaging system. In addition, EMS server allows software application and computer system to communicate semantically. In general, EDGE analytics server is utilized to collect, process and analyze data at edge of network.

In an embodiment of the present disclosure, the ANDSF application 130 is installed at the user device 146. In addition, the ANDSF application 130 is utilized to offload the user device 146 into wireless network (Wi-Fi). Further, the ANDSF application 130 configures wireless network (Wi-Fi) into the user device 146. In an embodiment of the present disclosure, the ANDSF application 130 offloads the user device 146 based on QoE (Quality of Experience) parameters. In an embodiment of the present disclosure, the ANDSF application 130 captures information associated with data session during mobile network and Wi-Fi network. In addition, information associated with data session includes but may not be limited to session start time, session end time, upload data, download data, category. Further, the ANDSF application 130 stores information associated with data session into a local database of the user device 146. Furthermore, the ANDSF application 130 transfers information associated with data session to EDGE analytical server 138. Moreover, EDGE analytical server 138 generates report for data consumption in mobile network and Wi-Fi network.

In an embodiment of the present disclosure, the ANDSF application 130 captures analytics information from the local database of the user device 146. In addition, analytics information includes policy pull, evaluation, offload, and RAM usage, uptime and the like. In an embodiment of the present disclosure, the ANDSF application 130 configures one-time interval on ANDSF server 132 to transfer analytics information on EDGE analytical server 138. In addition, the ANDSF application 130 runs background service based on configured one-time interval to send analytics information on EDGE analytics server 138. In an embodiment of the present disclosure, the ANDSF application 130 stores analytics information in the local database of the user device 146 when EDGE analytics server 138 is not accessible. In addition, the local database has dynamic size. Further, size of the local database is defined with threshold value. In an example, when size of the local database is increased above threshold value, then the ANDSF application 130 removes previous data and stores new records into the local database. In addition, the ANDSF application 130 removes and add records in first in first out (FIFO) manner. In an embodiment of the present disclosure, the ANDSF application 130 sync all records on server during server reachability. In addition, the ANDSF application 130 releases size from the local database.

In an embodiment of the present disclosure, the ANDSF application 130 invokes ANDSF services on specific domain URL. In an example, specific domain URL may be https://andsf01.mncXYZ.mccXYZ.com. In an embodiment of the present disclosure, the ANDSF application 130 generates dynamic URL of server when number of users increases. In an example, multiple server is deployed based on different region when number of user count is high. In an embodiment of the present disclosure, the ANDSF application 130 generates dynamic URL based on MCC (Mobile Country Code) and MNC (Mobile Network Code) value capture from wireless network (Wi-Fi). In an example, consider user A and user B. In addition, user A and user B are based in two different places. Further, user A and user B wants to gain access to server. Further, URL of server is generated for user A and user B. Furthermore, URL for user A is https://andsf01.mnc123.mcc123.com and user for server B is https://andsf01.mnc456.mcc123.com.

In an embodiment of the present disclosure, the ANDSF application 130 facilitates to offload of the user device 146 based on user configured SSID (Service Set Identifier). In addition, the ANDSF application 130 monitors QoE (Quality of Experience) parameters. Furthermore, the ANDSF application 130 calculates average single strength based on QoE parameters. Furthermore, QoE parameters facilitates the ANDSF application 130 to rove out decision based on calculated average signal strength. Moreover, QoE parameters depicts Wi-Fi signal strength. In an embodiment of the present disclosure, average signal strength facilitates the user device 146 to remain enable or disable from wireless network (Wi-Fi). In an embodiment of the present disclosure, the user device 146 remains enable or disable from wireless network (Wi-Fi) using regulate RSSI (Received signal strength indicator) check. In an example, the ANDSF application 130 disconnects the user device 146 from wireless network (Wi-Fi) using RSSI-OUT_OF_RANGE_MAX_COUNT. In addition, the ANDSF application 130 monitors wireless network (Wi-Fi) using RSSI_MONITOR_DURATION. Further, the ANDSF application 130 calculates RSSI value based on RSSI-OUT_OF_RANGE_MAX_COUNT and RSSI_MONITOR_DURATION. Furthermore, the ANDSF application 130 rove out the user device 146 based on RSSI value. In an example, the ANDSF application 130 receives low RSSI value. In addition, the ANDSF application 130 starts timer to monitor next RSSI call with increase in count.

In an embodiment of the present disclosure, the ANDSF application 130 includes mechanism for random policy pull. In addition, random policy pull facilitates the ANDSF application 130 to avoid high volume of auto-pull requests received at server on same time. In an embodiment of the present disclosure, the ANDSF application 130 invokes random policy pull using batch logic. In addition, batch logic reduces load on ANDSF server 132. Further, batch logic divides the user device 146 into one or more batches as per server configuration. In an example, consider 68 policy pull requests on ANDSF server 132. In addition, 68 policy pull requests are divided into 68 batches. In another example, first batch pull among 68 batches initiates at time 12:00. In addition, second batch pull initiates at time 12.05. Further, third batch pull initiated at time 12.10 and so on.

In an embodiment of the present disclosure, the ANDSF application 130 supports validation of location based policy using 3GPP location identifiers. In addition, location based policy includes PLMN (Public Land Mobile Network), TAC (Tracking Area Code), and ECI (E-UTRAN cell identifiers). Further, the ANDSF application 130 validates location based policy through level 1 space search and level 2 space search. In an embodiment of the present disclosure, ECI (E-UTRAN cell identifiers) list is transferred to geographical location associated with each ECI list with facilitation of ANDSF server 132. In an embodiment of the present disclosure, level 1 space search facilitates to scan ECI using the ANDSF application 130. In addition, the ANDSF application 130 creates frequently visited ECI (E-UTRAN cell identifiers) list associated with the offloading of wireless network (Wi-Fi). Further, ECI list is stored in data memory of the user device 146. In an embodiment of the present disclosure, when ECI list is not available in level 1 space search, then the ANDSF application 130 performs level 2 space search. In addition, level 2 space search facilitates to search for ECI list from ANDSF server 132. In an embodiment of the present disclosure, the ANDSF application 130 analyzes Wi-Fi coverage in ECI. In addition, if Wi-Fi coverage is not available in ECI then current ECI is not present in level 2 space search to serve PLMN (Public Land Mobile Network). In an example, level 1 space search accommodates fixed number of entries associated with ECI's and PLMN's to save battery of the user device 146.

In an embodiment of the present disclosure, the ANDSF application 130 offloads the user device 146 to policy SSID. In addition, the ANDSF application 130 holds policy evaluation during manual turn-off of wireless network (Wi-Fi). Further, policy evaluation is hold till expiry of exponential back off timer. In an example, the ANDSF application 130 connects the user device 146 with wireless network (Wi-Fi) during incidental turn-off of wireless network (Wi-Fi). In addition, if wireless network (Wi-Fi) is turned off for second time, then policy evaluation is kept hold till expiry of exponential back off timer.

In an embodiment of the present disclosure, the ANDSF application 130 controls and checks for policy Wi-Fi range during manual turn-on of Wi-Fi at the user device 146. In addition, the ANDSF application 130 attempts to connect with policy Wi-Fi without checking QoE parameters if policy Wi-Fi is not in range.

In an embodiment of the present disclosure, the ANDSF application 130 invokes policy from ANDSF server 132 periodically. In an embodiment of the present disclosure, policy includes ECI list, discovery information, global parameters and the like. Further, policy is applicable based on PLMN (Public Land Mobile Network) network. In an embodiment of the present disclosure, the ANDSF application 130 fetches policy first time from ANDSF server 132. In addition, the ANDSF application 130 passes PLMN network to collect PLMN value. Further, PLMN value facilitates ANDSF server 132 to respond with policy. Furthermore, ANDSF server 132 provides time flag when last policy pull is done using the ANDSF application 130. Moreover, time flag corresponds to last sync time. In an embodiment of the present disclosure, time flag facilitates the ANDSF server 132 to validate any change occurred in policy. In an example, ANDSF server 132 respond with "Policy Already Updated" if no change occurred on ANDSF server 132.

In an embodiment of the present disclosure, the ANDSF application 130 includes customized logic to reconnect the user device 146 with ANDSF server 132. In addition, customized logic to reconnect the user device 146 is utilized if ANDSF server 132 is not reachable.

In an embodiment of the present disclosure, ANDSF server 132 includes PLMN based restriction. In addition, ANDSF server 132 allows registration of the user device 146 based in configured MCC and MNC. In an embodiment of the present disclosure, the ANDSF application 132 allows registration of the user device 146 based one or more parameters. In addition, the one or more parameters include manufacturer name and model name. In an example, manufacturer name is IN ('samsung', 'google', 'motorola') AND MCC='123' AND MNC IN ('857','874','864').

In an embodiment of the present disclosure, the ANDSF application 130 offloads the user device 146 on preconfigured WPA Wi-Fi. In an example, the ANDSF application 130 offloads the user device 146 when WPA (Wi-Fi Protected Access) Wi-Fi is in range of the user device 146. In an example, consider multiple preconfigured SSID available in range of the user device 146. In addition, multiple preconfigured SSID are scanned using the ANDSF application 130 to search for SSID with high signal strength.

In an embodiment of the present disclosure, the ANDSF application 130 is controlled using ANDSF server 132. In addition, ANDSF server 132 controls one or more features of the ANDSF application 130 using push notification. In an example, push notification enables and disables log on the ANDSF application 130 from ANDSF server 132. In another example, push notification is utilized to push ANDSF server 132 to the ANDSF application 130 in case of policy change. In yet another example, push notification is utilized to enable and disable the ANDSF application 130 on the user device 146. In yet another example, push notification instantly update logs on ANDSF server 132.

In an embodiment of the present disclosure, the ANDSF application 130 includes Wi-Fi hold. In addition, Wi-Fi hold is utilized by the ANDSF application 130 during failure in Wi-Fi connection establishment. Further, the ANDSF application 130 keeps Wi-Fi SSID on hold for configured time interval using Wi-Fi hold. Furthermore, Wi-Fi hold facilitates the ANDSF application 130 to connect with Wi-Fi SSID after configured time interval is complete.

In an embodiment of the present disclosure, ANDSF server 132 is connected with cloud 140. In general, cloud provides services to ANDSF server 132.

In an embodiment of the present disclosure, the ANDSF application 130 is associated with SDK (Software Development kit) 142 through HTTPS (Hyper Text Transfer Protocol Secure). In general, SDK is software tool to develop software applications. In general, HTTPS is used for secure communication over network. In an embodiment of the present disclosure, SDK 142 is connected with ANDSF server 132 through HTTPS and S14.

The ANDSF mobility architecture 100 includes EAP (Extensible Authentication Protocol) authentication 144. In general, EAP is authentication framework that is used in wireless networks. In addition, EAP facilitates to establish point to point connections.

Figure 2:
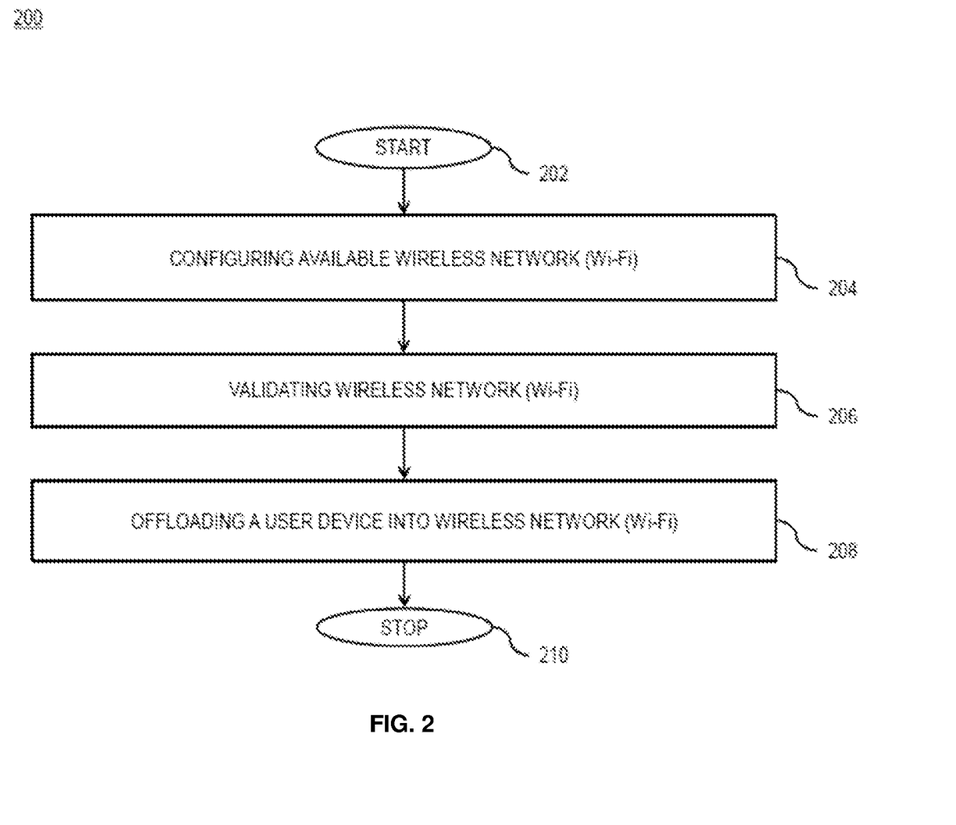
FIG. 2 illustrates a flow chart for offloading the user device into wireless network (Wi-Fi) using the ANDSF application, in accordance with various embodiments of the present disclosure.

FIG. 2 illustrates a flow chart 200 to offload the user device 146 into wireless network (Wi-Fi) using the ANDSF application 130, in accordance with various embodiments of the present disclosure. The flow chart 200 initiates at step 202. Following step 202, at step 204, the method includes to configure available wireless network (Wi-Fi) at the user device 146. In addition, wireless network (Wi-Fi) is configured into ANDSF policy. Further, ANDSF policy is configured in ANDSF server 132. Furthermore, ANDSF server 132 is associated with the ANDSF application 130. At step 206, the method includes to validate wireless network (Wi-Fi) at the user device 146. In addition, wireless network (Wi-Fi) is validated using the ANDSF application 130. Further, the ANDSF application 130 validates configured wireless network (Wi-Fi) based on Quality of Experience (QOE) parameters. At step 208, the method includes to offload the user device 146 into wireless network (Wi-Fi). In addition, the user device 146 is offloaded using the ANDSF application 130. The flow chart terminates at step 210.

Figure 3:
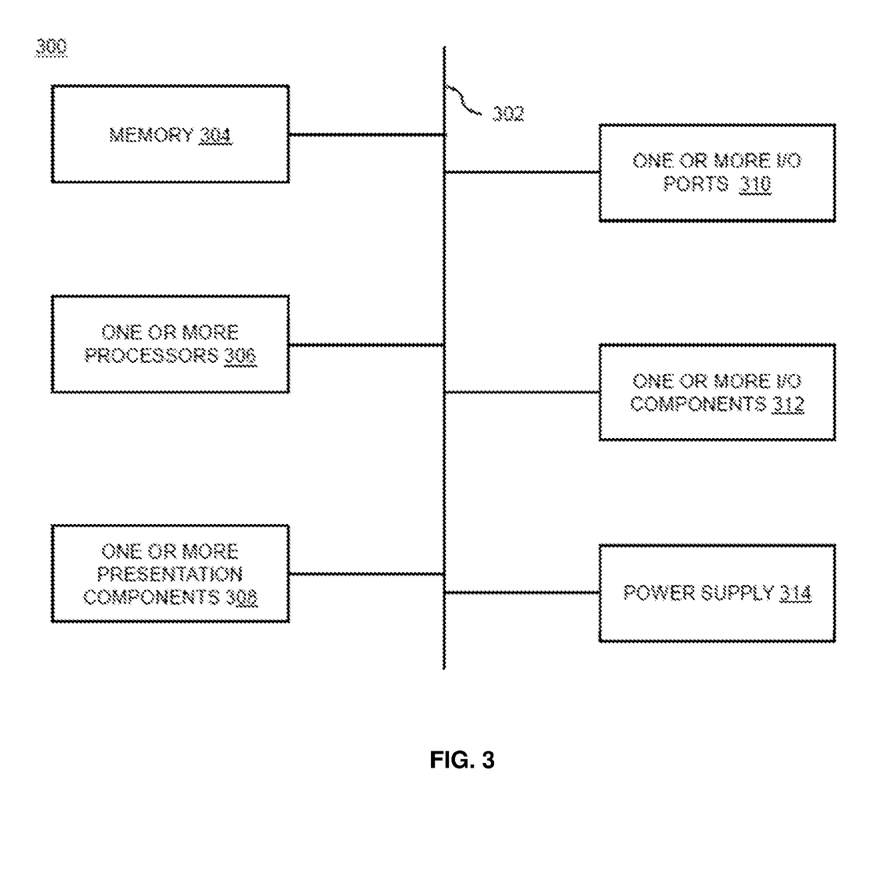
FIG. 3 illustrates a block diagram of the user device of FIG. 1, in accordance with various embodiments of the present disclosure.

FIG. 3 illustrates a block diagram 300 of the user device 146 of FIG. 1, in accordance with various embodiments of the present disclosure. The user device 146 is required to run the ANDSF application 130. The user device 146 includes various components that work synchronously to enable processing of the ANDSF application 130 and allows storing of data in the user device 146. The user device 146 includes a bus 302 that directly or indirectly couples the following devices: memory 304, one or more processors 306, one or more presentation components 308, one or more input/output (I/O) ports 310, one or more input/output components 312, and an illustrative power supply 314. The bus 302 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 3 is merely illustrative of an exemplary user device that can be used in connection with one or more embodiments of the present invention. Distinction is not made between such categories as "workstation," "server," "laptop," "hand-held device," etc., as all are contemplated within the scope of FIG. 3 and reference to "hardware framework."

The user device 146 typically includes a variety of computer-readable media. The computer-readable media can be any available media that includes both volatile and nonvolatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, non-transitory computer-readable storage medium that stores program code and/or data for short periods of time such as register memory, processor cache and random access memory (RAM), or any other medium which can be used to store the desired information. The computer storage media includes, but is not limited to, non-transitory computer readable storage medium that stores program code and/or data for longer periods of time, such as secondary or persistent long term storage, like read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. The memory 304 may be removable, non-removable, or a combination thereof. Exemplary hardware devices include solid-state memory, hard drives, optical-disc drives, etc. The hardware framework 300 includes the one or more processors 306 that read data from various entities such as memory 304 or I/O components 312. The one or more presentation components 308 present data indications to a user or other device. Exemplary presentation components include a display device, speaker, printing component, vibrating component, etc.

The present invention has various advantages over the prior art. The present invention provides the method to offload the user device from mobile network to Wireless network using the ANDSF application. In addition, the ANDSF application utilizes intelligent network services to monitor device events, QoE (Quality of Experience) parameters and rules and actions on policy. Further, the ANDSF application utilizes 3GPP standard policy management to manage policy pull cache, evaluation and application. Furthermore, the ANDSF application utilizes EDGE analytics to check user activity such as location, radio, and proximity analytics and on/off network usage.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A method for automatic offloading of a user device from a mobile communication network into a wireless fidelity (Wi-Fi) network using an Access Network Discovery and Selection Function (ANDSF) application, the method comprising:
   configuring, at the user device, an available Wi-Fi network, (Wi-Fi), wherein the Wi-Fi network is configured into an ANDSF policy, wherein the ANDSF policy is configured in an ANDSF server, wherein the ANDSF server is associated with the ANDSF application;
   validating, at the user device, the Wi-Fi network, wherein the Wi-Fi network is validated using the ANDSF application, wherein the ANDSF application validates the Wi-Fi network (Wi-Fi) based on Quality of Experience (QOE) parameters, and the QOE parameters include a calculated average signal strength; and
   offloading the user device into the Wi-Fi network based at least in part on the calculated average signal strength, wherein the user device is offloaded using the ANDSF application, wherein the ANDSF application offloads the user device into the Wi-Fi network (Wi-Fi) with a high signal strength.

2. The method as claimed in claim 1, wherein the ANDSF application, further comprising, capturing analytics information at the user device, wherein analytics information comprising policy pull, evaluation, offload, RAM usage, and up time, wherein analytical information is captured for each data session associated with the Wi-Fi network and mobile network, wherein analytical information is stored into local database associated with the user device.

3. The method as claimed in claim 1, wherein the ANDSF application monitors QoE (Quality of Experience) parameters during offloading of the user device, wherein QoE parameters are monitored for checking signal strength associated with the Wi-Fi network.

4. The method as claimed in claim 1, wherein the ANDSF application allocates one or more dynamic servers during increase in number of users at particular location, wherein the ANDSF application allocates the one or more dynamic servers based on MCC (Mobile Country Code) and MNC (Mobile Network Code) value captured from the Wi-Fi network.

5. The method as claimed in claim 1, wherein the ANDSF application applies batch logic during increase in number of users, wherein batch logic is applied using policy pull associated with the ANDSF application.

6. The method as claimed in claim 1, wherein the ANDSF application supports validation of location based policy using 3GPP location identifiers.

7. The method as claimed in claim 1, wherein the ANDSF application facilitates regulating a received signal strength (RSS) check during reduction in signal strength of the first Wi-Fi network (Wi-Fi), wherein regulating the RSS check avoids toggling in the first Wi-Fi network. (Wi-Fi).

8. The method as claimed in claim 1, wherein the ANDSF application comprises policy and customized logic for reconnecting the user device, wherein policy and customized logic for reconnecting the user device facilitates the ANDSF application in saving bandwidth usage.

9. The method as claimed in claim 1, wherein the ANDSF application implements Public Land Mobile Network (PLMN} based restriction, wherein PLMN based restriction facilitates the ANDSF application for allowing registration of the user device using configured MCC (Mobile Country Code) and MNC (Mobile Network Code).

10. The method as claimed in claim 1, wherein the ANDSF application supports offloading of the user device on preconfigured Wi-Fi Protected Access (WPA-Wi-Fi).

11. The method as claimed in claim 1, wherein the ANDSF application comprises ANDSF server, wherein ANDSF server controls the ANDSF application using push notification.

12. A method for automatic offloading of a user device into a wireless fidelity (Wi-Fi) network using an Access Network Discovery and Selection Function (ANDSF) application, the method comprising:
configuring, at the user device, an available Wi-Fi network an ANDSF policy, wherein the ANDSF policy associated with the ANDSF application;
validating, at the user device, the Wi-Fi network using the ANDSF application, wherein the ANDSF application validates the Wi-Fi network based on Quality of Experience (QOE) parameters, and the QOE parameters include a calculated average signal strength; and
offloading the user device into the Wi-Fi network based at least in part on the calculated average signal strength, wherein the ANDSF application offloads the user device into the Wi-Fi network with a high signal strength.

13. The method as claimed in claim 12 further comprising capturing analytics information at the user device, wherein the analytics information comprising a policy pull, an evaluation, an offload, a RAM usage, and an up time, wherein the analytical information is captured for each data session associated with the Wi-Fi network and mobile network, wherein analytical information is stored into local database associated with the user device.

14. The method as claimed in claim 12, wherein the ANDSF application monitors QoE (Quality of Experience) parameters during offloading of the user device, wherein QoE parameters are monitored for checking signal strength associated with the Wi-Fi network.

15. The method as claimed in claim 12, wherein the ANDSF application allocates one or more dynamic servers during increase in number of users at particular location, wherein the ANDSF application allocates the one or more dynamic servers based on MCC (Mobile Country Code) and MNC (Mobile Network Code) value captured from the Wi-Fi network.

16. The method as claimed in claim 12, wherein the ANDSF application applies batch logic during increase in number of users, wherein batch logic is applied using policy pull associated with the ANDSF application.

17. The method as claimed in claim 12, wherein the ANDSF application supports validation of location based policy using 3GPP location identifiers.

18. The method as claimed in claim 12, wherein the ANDSF application facilitates regulate received signal strength (RSS} check during reduction in signal strength of the Wi-Fi network, wherein regulate RSS check avoids toggling in the Wi-Fi network.

19. The method as claimed in claim 12, wherein the ANDSF application comprises policy and customized logic for reconnecting the user device, wherein policy and customized logic for reconnecting the user device facilitates the ANDSF application in saving bandwidth usage.

20. The method as claimed in claim 12, wherein the ANDSF application implements Public Land Mobile Network (PLMN} based restriction, wherein PLMN based restriction facilitates the ANDSF application for allowing registration of the user device using configured MCC (Mobile Country Code) and MNC (Mobile Network Code).

21. The method as claimed in claim 12, wherein the ANDSF application supports offloading of the user device on preconfigured Wi-Fi Protected Access (WPA-Wi-Fi).

22. The method as claimed in claim 12, wherein the ANDSF application comprises ANDSF server, wherein ANDSF server controls the ANDSF application using push notification.

* * * * *